(12) United States Patent
Appavoo et al.

(10) Patent No.: US 7,818,736 B2
(45) Date of Patent: *Oct. 19, 2010

(54) DYNAMIC UPDATE MECHANISMS IN OPERATING SYSTEMS

(75) Inventors: Jonathan Appavoo, New York, NY (US); Andrew Arnott Baumann, Chatswood (AU); Dilma Menezes da Silva, White Plains, NY (US); Orran Yaakov Krieger, Newton, MA (US); Robert William Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1405 days.

This patent is subject to a terminal disclaimer.

(21) Appl. No.: 11/227,761

(22) Filed: Sep. 14, 2005

(65) Prior Publication Data

US 2007/0061372 A1 Mar. 15, 2007

(51) Int. Cl.
G06F 9/44 (2006.01)
G06F 15/16 (2006.01)
(52) U.S. Cl. ...................... 717/168; 719/332
(58) Field of Classification Search ................ 717/162, 717/268, 681; 719/332
See application file for complete search history.

(56) References Cited

U.S. PATENT DOCUMENTS 7,533,377 B2 * 5/2009 Appavoo et al. ............ 717/168

2005/0071811 A1 3/2005 Appavoo et al. ............ 717/122

OTHER PUBLICATIONS

Malabarba et al., Runtime Supoprt for Type-Safe Dynamic Java Classes, Jan. 1, 2000, Springer Berlin / Heidelberg, Lecture Notes in Computer Science, vol. 1850/2000, ECOOP 2000—Object-Oriented Programming, pp. 337-361.*
Andrew Baumann, Gernot Heiser, Jonathan Appavoo, Dilma Da Silva, Orran Krieger, Robert W. Wisniewski, Jeremy Kerr, Providing dynamic update in an operating system, Proceedings of the annual conference on USINEX Annual Technical Conference, p. 32-32, Apr. 10-15, 2005, Anaheim, CA.*

(Continued)

Primary Examiner—James Rutten
(74) Attorney, Agent, or Firm—Harrington & Smith

(57) ABSTRACT

To dynamically update an operating system, a new factory object may have one or more new and/or updated object instances. A corresponding old factory object is then located and its version is checked for compatibility. A dynamic update procedure is then executed, which includes (a) changing a factory reference pointer within the operating system from the old factory object to the new factory object. For the case of updated object instances, (b) hot swapping each old object instance for its corresponding updated object instance, and (c) removing the old factory object. This may be performed for multiple updated object instances in the new factory object, preferably each separately. For the case of new object instances, they are created by the new factory and pointers established to invoke them. A single factory object may include multiple updated objects from a class, and/or new object instances from different classes, and the update may be performed without the need to reboot the operating system.

20 Claims, 3 Drawing Sheets

OTHER PUBLICATIONS

Craig A. N. Soules, Jonathan Appavoo, Kevin Hui, Robert W. Wisniewski, Dilma Da Silva, Gregory R. Ganger, Orran Krieger, Michael Stumm, Marc Auslander, Michal Ostrowski, Bryan Rosenburg, Jimi Xenidis, "System Support for Online Reconfiguration", Proceedings of Usenix 2003, pp. 141-154.*

Baumann, Kerr, Appavoo, Da Silva, Krieger, Wisniewski, "Module Hot-Swapping for Dynamic Update and Reconfiguration in K42" Apr. 2005, Proceedings of Linux.conf.au, Canberra Australia.*

Shalloway and Trott, "Design Patterns Explained: A New Perspective on Object-Oriented Design, Second Edition" Oct. 12, 2004, Addison-Wesley Professional, Chapter 20.*

Hjálmtýsson, G. et al., "Dynamic C++ Classes A lightweight mechanism to update code in a running program", Jun. 1998, Proceedings of the USENIX Annual Technical Conference (NO98), New Orleans, Louisiana, 13 pgs.

Pu, C. et al., "Optimistic Incremental Specialization: Streamlining a Commercial Operating System", 11 pgs.

Stoyle, G. et al., "*Mutatis mutandis*: Safe and Predictable Dynamic Software Updating", Jan. 12-14, 2005, POPL '05, Long Beach, California, 12 pgs.

Solaris 9, Apr. 2004 Installation Guide, 4 pgs.

Appavoo, J. et al., "Enabling autonomic behavior in systems software with hot swapping", IBM Systems Journal, vol. 42, No. 1, 2003, pp. 60-76.

Da Silva, D. M. et al., "KFS: Exploring Flexibility In File System Design", IBM TJ Watson Research Center, Aug. 2004, 9 pgs.

* cited by examiner

NEW FACTORY

SWAP FACTORY

NEW FACTORY INSTALLED

UPDATE INSTANCES

COMPLETE

```
class PageAllocatorKernPinned_Update: public PageAllocatorKernPinned {
public:
    BLock nextMemDescLock;
    void pinnedInit(VPNum numaNode) {
        nextMemDescLock.init();
        PageAllocatorKernPinned::pinnedInit(numNode);
    }
    virtual void* getNextForMDH(uval size) {
        AutoLock<BLock>al(&nextMemDescLock);//locks now, unlocks on return
        return PageAllocatorKernPinned::getNextForMDH(size);
    }
};
DEFINE_GLOBALPADDED_NEW (PageAllocatorKernPinned_Update);//K42-ism
```

FIG.2

DYNAMIC UPDATE MECHANISMS IN OPERATING SYSTEMS

FIELD OF THE INVENTION

This invention relates to the field of computer operating systems and particularly to software updates to such operating systems that are loaded and implemented without having to reboot the operating system.

BACKGROUND

An operating system is a computer program that is the first piece of software that a computer executes when a computing device is turned on. Operating systems are no longer limited to mainframe and desktop computers: mobile telephones and various other portable devices now use operating systems to enable and manage multiple different functionalities of their host device, so the term computer system is not limited to a traditional mainframe/desktop device. In certain networked arrangements, one operating system may manage and be accessed by multiple user stations simultaneously, which is considered within the definition of a single computer system. The operating system loads itself into memory and begins managing the resources available on the computer. It then provides those resources to other applications that the user wants to execute. Typical services that an operating system provides include a task scheduler, a memory manager, a disk manager, a network manager, other I/O services manager, and a security manager. These services are exemplary only. The core operating system functions, the management of the computer system, lie in what is termed the kernel of the operating system in a traditional computer architecture. In a microkernel architecture, core operating system functionality can lie on system servers, outside the kernel. The kernel is often considered as how the operating system is displayed to the user of a device, but in fact the kernel lies below the display manager (though is often tightly tied to it).

At the simplest level, an operating system manages the hardware and software resources of the device or system (e.g., processor, memory, disk space, etc.), and it provides a stable, consistent way for applications to deal with the hardware without having to know all the hardware details. The first task, managing the hardware and software resources, is very important, as various programs and input methods compete for the attention of the central processing unit (CPU) and demand memory, storage and input/output (I/O) bandwidth for their own purposes. In this capacity, the operating system ensures that each application gets the necessary resources and ensures proper interfacing between applications, as well as husbanding the limited capacity of the system for maximum usage by the various users and applications. The second task, providing a consistent application interface, is especially important if there is to be more than one of a particular type of computer using the operating system (e.g., a single operating system for computer systems made by different manufacturers), or if the computer system hardware is changed or updated. A consistent application program interface (API) allows developers of application software to write code on one computer system and have a high level of confidence that it will run on another computer system using the same operating system, even if the amount of memory, the quantity of storage, or even the computing architecture is different on the two computer systems.

As computing infrastructure becomes more widespread, updates to various software programs have become more common. These are generically termed patches, and there have been an increasing number of patches for functionality, performance, and especially security reasons. To take effect, these patches traditionally require either restarting system services, or often rebooting the operating system, resulting in downtime. Sometimes this downtime can be scheduled, if for example the patch adds a feature, improves performance, etc. In other situations such as applying a security patch, delaying the update is not desirable. Users and system administrators are forced to trade off the increased vulnerability of a security flaw against the cost of unplanned downtime. Dynamic update is used to avoid such downtime, and involves on-the-fly application of software updates to a running system without loss of service.

In addition to the above-mentioned impact on availability, dynamically updatable operating systems have other benefits. Such operating systems provide a good prototyping environment. They allow, for example, a new page replacement, file system, or network policy to be tested without rebooting. Further, in more mature computer systems such as mainframes, some user constraints prevent the operating system from ever being shutdown. In such an environment, users can only get new functionality into the operating system by performing a dynamic update.

An operating system is a unique environment with special constraints as compared to an application, and additional challenges must be solved to provide dynamic update functionality. An important piece of prior art is described in U.S. Patent Application Publication No. 2005/0071811 A1 to Appavoo et al. (hereinafter, the Appavoo publication). The Appavoo publication discloses how to swap an individual object instance and discusses other prior art references detailed below. The Appavoo publication is hereby incorporated by reference, and it is noted that each inventor of the Appavoo publication is an inventor of this application.

One reference detailed in the Appavoo publication is entitled: "Dynamic C++ Classes: A Lightweight Mechanism to Update Code in a Running Program," by Gisli Hjalmtysson and Robert Gray (Annual USENIX Technical Conference, June 1998, pps 65-76, USENIX Association). The Hjalmtysson and Gray reference describes a mechanism for updating C++ objects in a running program, but, in the disclosed system, client objects need to be able to recover from broken bindings due to an object swap and retry the operation, so the mechanism is not transparent to client objects. Moreover, the Hjalmtysson and Gray approach does not detect quiescent state, and old objects continue to service prior calls while the new object begins to service new calls.

Another reference detailed in the Appavoo publication is entitled: "Optimistic Incremental Specialization: Streamlining a Commercial Operating System," by Calton Pu, Tito Autrey, Andrew Black, Charles Consel, Crispin Cowan, Jon Inouye, Lakshmi Kethana, Jonathan Walpole and Ke Zhang (ACM Symposium on Operating System Principles, Copper Mountain Resort, Colo., Dec. 3-6, 1995, Operating Systems Review, vol 29, no 5). This reference describe a replugging mechanism for incremental and optimistic specialization, but the reference assumes there can be at most one thread executing in a swappable module at a time. In later work, that constraint is relaxed but does not scale.

As mentioned, the Appavoo publication and the works discussed therein describe how to hot-swap an individual object. For a true dynamic upgrade, all objects of a given class need to be swapped.

Another reference, entitled "Mutatis Mutandis: Safe and Predictable Dynamic Software Updating" by G. Stoyle, M. Hicks, G. Bierman, P. Sewell and I. Neamtiu (POPL '05, Jan. 12-14, 2005, Long Beach, Calif.) describes a formal model for dynamic update in C-like languages using pre-computed safe update points present in the code.

Some commercial operating systems offer features similar to Sun® Microsystems' Solaris Live Upgrade, which allows changes to be made and tested without affecting the running system, but requires a reboot for changes to take effect. Other approaches are limited to perform an upgrade on a single threaded user-space applications cite.

What is needed is a dynamic upgrade approach that is scalable for both upgraded objects and new objects, for both single CPU computer systems and those with hypervisors and multiple instances of operating systems, that has the capability to track objects and to dynamically upgrade all objects of a particular type in a running operating system, without the need to shut down or reboot that operating system.

SUMMARY

The present invention enables dynamic updates to operating system software, and as compared to the prior art of which the inventors are aware, provides much greater flexibility in that it is scalable to update the operating system kernel, update one or more objects, and/or add one or more objects to the operating system. It is particularly valuable for adding security patches, in that reboot is unnecessary for the patch to be implemented and accessible by the operating system, and any patch may be incorporated dynamically without interrupting access to the operating system as a whole.

In one embodiment, the present invention is a signal bearing medium tangibly embodying a program of machine-readable instructions executable by a digital processing apparatus to perform operations to dynamically update an operating system. The operations include loading a new factory object that has at least one updated object instance within an object class. All object instances of the new factory object are within the same class. Then, an old factory object that has at least one old object instance within that same object class is located. The old factory object is identified by the new factory object. A dynamic update procedure is then executed, which includes (a) changing a factory reference pointer within the operating system from the old factory object to the new factory object, (b) hot swapping the old object instance for the updated object instance, and (c) removing the old factory object.

In another embodiment, the present invention is a method of dynamically updating an operating system that includes loading a new factory object having at least one new object instance and one updated object instance, determining that a version identifier of an old factory object meets what is termed a versioning evolution requirement (e.g., compatibility with the new factory object, detailed below), and setting a pointer that goes between a factory reference and an old factory object to go between the factory reference and the new factory object. For the case of the updated object instances, the method involves several steps: establishing a safe point (e.g., a quiescent state) for an old object instance that corresponds to the updated object instance; changing a factory reference pointer within the operating system from the old factory object to the new factory object; hot swapping the old object instances for the updated object instances; and deleting the old object instances. For the case of all new object instances, the method includes establishing a pointer from the new factory object to the new object and deleting the old factory object.

According to another embodiment, the present invention is a method of dynamically updating an operating system that includes loading a new class definition corresponding to an update implementation of at least one existing old class definition, determining that version of the updated class meets a versioning requirement, and setting data structures to indicate that new object instantiations of the old class are satisfied by the new class. Any object instances of the old class are then replaced by instances of the new class. A safe point is established for each old object instance that corresponds to an updated object instance, the old object instances are hot-swapped for the updated object instances, and the old object instances are deleted in order to perform the method.

These and other embodiments are detailed further below.

BRIEF DESCRIPTION OF THE DRAWINGS

The present invention is more fully understood with reference to the following drawing figures.

FIG. 1, separated into

FIG. 2 is an example of an update to source code for fixing a bug in a kernel service according to embodiments of the invention.

DETAILED DESCRIPTION

Figure 1A:
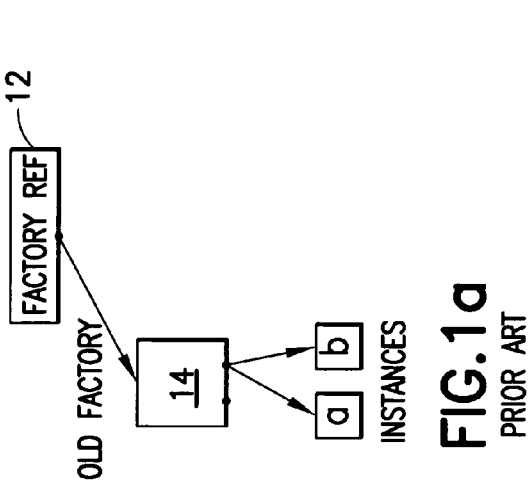
FIGS. 1A-1F, are schematic diagrams of steps involved in a dynamic upgrade using the factory method of the present invention.

The present invention is not limited to the following described embodiment. It provides a most common implementation, but one skilled in the art will see enhancements that are still keeping within the scope covered by the embodiment.

Dynamic update is a mechanism that allows software updates and patches to be applied to a running operating system without loss of service or downtime. Dynamic update on an operating system places unique demands on its implementation, as compared to dynamic update of applications. These demands stem from the event-driven nature of operating systems, from their restricted run-time execution environment, and from their role in simultaneously servicing multiple clients, whether those clients are different user stations or different applications (in a multi-tasking environment). Various embodiments of the present invention support updating both kernel code and data structures. Some terms are now defined in order to more particularly describe the invention and its operation.

Updatable unit: In order to update an operating system, it is necessary to identify an updatable unit. Depending on the class of update supported, and the implementation of the system, an updatable unit may consist of a code module, or of both computer code and encapsulated data. In both cases, the updatable unit must have a clearly defined interface to the operating system as a whole (e.g., to other portions of the operating system apart from the particular updatable unit being considered). Furthermore, external code should invoke the updatable unit in a well-defined manner, and should not arbitrarily access code or data of that unit.

While creating updatable units is straightforward with support from languages such as C++, it is still possible without such support. Primarily, providing updatable units means designing the operating system with good modularity, where the various updatable units obey module boundaries. The structure of the operating system dictates what is feasible. As detailed in the Appavoo publication, objects may share a back end such as an underlying data structure, but are carefully constructed to avoid sharing a front end through which they are invoked by other system resources.

Safe Point: Dynamic updates should not occur while any affected computer code or data is being accessed. That is, an updatable unit should not be updated while any part of that updatable unit is in use. To do otherwise would cause undefined behavior. It is therefore important to determine when an update may safely be applied, while minimizing any delay in applying that update. In general however, this is undecidable because the computer system generally does not know in advance whether an object is to remain quiescent or is soon to be invoked. Thus, operating system support is required to achieve and detect what is termed a safe point. Dynamic updates may involve requiring the operating system to be programmed with explicit update points or safe points, or by detecting when an updatable unit becomes idle or quiescent and blocking accesses to that updatable unit by other non-updating functions while that particular object is being updated. Each safe point applies to a specific updatable unit. When an updatable unit reaches a safe point, it is no longer being invoked by the computer system.

An operating system is fundamentally event-driven, responding to application requests and hardware events. This differs from most applications, which are structured as one or more threads of execution. As detailed below, this event-based model can be used to detect when an updatable unit of the system has reached a safe point. Additional techniques can be employed to handle blocking I/O events or long running daemon threads. A daemon thread works in the background to support the runtime environment (e.g., a clock handler thread, an idle thread, a garbage collector thread, a screen updater thread). Since the safe point is by definition that point when an updatable unit is no longer active, daemon threads as well as user-initiated threads that apply to a specific updatable unit must not cross a safe point for that updatable unit. Determining and establishing a quiescent state or safe point is detailed in the Appavoo publication further. Generally, an indirection virtual entity (termed a mediator in the Appavoo reference) is disposed in advance of the object in question. Current threads are allowed to continue accessing the object, newly invoked threads are blocked at the mediator, and when all current threads expire, the quiescent state is established.

State Tracking: For a dynamic update system to support changes to data structures, it must be able to locate and convert all such structures. This requires identifying and managing all instances of state maintained by an updatable unit (particularly those that include data structures, but preferably all updatable units) in a uniform fashion. This functionality is usually provided in software systems using what is termed a factory design pattern, or for brevity, factories. Note that two classes of updates, dynamic update to code and dynamic update to single-instance data, are still possible without state tracking. A state tracking mechanism enables dynamic updates that affect multiple-instance data, that data that is present in more than one updatable unit.

State Transfer: When an update is applied that affects data structures, or when an updated unit maintains its internal state without change (e.g., the updated unit and the original unit are substantively identical, perhaps changing only in version number), the state of that updated unit must be transferred so that it may be invoked transparently from the updatable unit it replaced without interruption or discontinuity. The state transfer mechanism performs this task, and is how changes to data structures can be supported.

Redirection of Invocations: After the update to an updatable unit occurs, all future requests affecting the old updatable unit should be satisfied by the replacement updated unit, including invocations of computer code in the updated unit itself (which may include portions of the original updatable unit that remain unchanged, but which need not always be copied in the update process as detailed below). Redirection of invocations is detailed further in the Appavoo publication under the headings "Transfer Phase" and "Completion Phase". Furthermore, in a system supporting multiple-instance data structures, creation of new data structures of the affected type should produce the updated data structure.

Version Management: In order to package and apply an update, and in order to debug and understand the running system, it is necessary to know what code is actually executing prior to the updates being applied. This is inherent in the concept of performing updates after reaching a safe point for a particular updatable unit. If a current update depends on another update having previously been applied, then some means is required to verify which previous updates have already been applied. Absent this, the current update may cause an error, such as replacing a segment of code that should have been modified by a previous update that, in fact, may have never been executed. Furthermore, if updates may come from multiple sources, the versioning may be non-linear, causing the interdependencies between updates to become complex and difficult to track.

The level of support required for version management is affected by the complexity of update interdependencies, but at a minimum, Version Management should track a version number for each update present in the system, and for these version numbers to be checked before a current update is applied. A version evolution requirement is merely satisfying the criterion for version management, and may include that the old version precedes in sequential number the updated version, or falls within a certain date of most recent revision, or other version checking mechanisms known in the art.

Having now described the context and terms, implementations of dynamic updating of operating systems according to the present invention are now detailed. According to certain embodiments, dynamic updating is scalable for open-source operating systems incorporating innovative mechanisms and policies, and for modern programming technologies. Preferably, these scalable dynamic update protocols run on 64-bit, cache-coherent PowerPC systems, and supports the Linux API and ABI. These use a modular object-oriented design to achieve multiprocessor scalability, enhance customizability, and enable rapid prototyping of experimental features (such as different implementations of dynamic update).

Object-oriented architecture is used throughout the design of the operating system to enable dynamic updating. Each resource of the computing system (for example, virtual memory region, network connection, open file, or process) is managed by a different set of object instances. Each object of an object instance encapsulates the meta-data necessary to manage the resource as well as the locks necessary to manipulate the meta-data. This architecture avoids global locks, data structures, and policies that are present in some operating systems that might otherwise prevent isolation of individual objects by safe points. The object-oriented nature enables adaptability, because different resources can be managed by different implementations. For example, each running process in the system may be represented by an in-kernel instance of the process object Process (analogous to the process control block structure present in other operating systems). Presently two implementations of the "process" interface exist: ProcessReplicated and ProcessShared. ProcessReplicated is the default and ProcessShared is optimized for the case where a process exists on only a single CPU. In these embodiments of the present invention, the kernel defaults to creating replicated processes, but allows for a combination of replicated and shared processes.

Dynamic updating according to some embodiments of the invention uses clustered objects, which is a mechanism that enables a given object to control its own distribution across processors. Clustered objects are detailed further in the Appavoo publication. The inventors successfully hot-swapped objects using the object translation table facility provided by clustered objects. Hot-swapping allows an object instance to be transparently switched from an older version to an updated version of the object while the overall computing system is running, and is an important aspect of the present dynamic update implementation. As the name implies, transparent switching is invisible to a user. While all users may be denied access to the particular object being updated once that object reaches a safe point and further access is blocked while it is being updated, the users retain access to all other unblocked objects and instances during that time.

Preferably, the dynamically updatable unit is the same as for hot-swapping, namely the object instance. The operating systems that use the present invention use a coding style that enforces encapsulation of data within objects. It is important to note that all data lies within an object, typically the back end that does not uniquely differentiate over other objects. Each object's interface may be declared in a virtual base class, allowing clients of an object to use any implementation, and for the implementation to be changed transparently by hot-swapping.

Respecting safe points, embodiments of the present invention can detect quiescent states using any of various mechanisms, such as a read copy update (RCU) found in the Linux operating system. Using the RCU as a safe point makes use of the fact that each system request is serviced by a new kernel thread, and that all kernel threads are short-lived and non-blocking. Each thread belongs to a certain epoch, or generation, which was the active generation when it was created. A count is maintained of the number of live threads in each generation, and by advancing the generation and waiting for the previous generations' counters to reach zero, it is possible to determine when all threads that existed on a processor at a specific instance in time have terminated.

While waiting for the currently running threads to a particular object to finish, new invocations of that object are blocked and the generation-count mechanism above is used to detect quiescence of that object. Once all those threads have terminated, a safe point is reached and the object instance may be swapped or otherwise updated, and afterwards made immediately available for access by other resources of the operating system without the necessity of a reboot.

State tracking is preferably provided by factory objects, which is detailed with particularity below for the case where multiple objects in a class are added or updated. State transfer, on the other hand, relates to changing an indicator for a specific object to indicate that it has indeed been updated with the current patch. Factory objects use state transfer also but on a repetitive basis for each of the objects that are updated by that particular factory. Once the object being swapped is quiescent, the update framework invokes a state transfer mechanism which transfers state from the old object to the new object, using a transfer negotiation protocol to allow the negotiation of a common intermediate format that both objects support. There are several common intermediate formats that object developers currently use to implement patches. These common intermediate formats enable data to be converted from the old object to the new object, as the updated object may sometimes be in a different format that that of the old object. The Appavoo publication details the use of a mediator to record the most desirable format derived from two lists, obtained prior to a hot-swap, from the old and new object instance, and using a most significant bit taken by logically AND'ing bit vectors of the two different protocols resolves the most desirable format in the most significant bit. While the inventors prefer the mediator embodiment of the Appavoo publication, the specifics of the intermediate format are a design choice, and will not be explored further in this description.

The transfer negotiation protocol is a generalized technique that was developed to support hot-swaps between any arbitrary implementations of an object. In the case of dynamic update, the replacement object is typically only a slightly modified version of the original object, with similar state information, so the conversion functions perform either a direct copy, or a copy with slight modifications.

Invocations of the new or updated object instances use a per-address-space, or an object translation table. Each object has an entry in the table, and all object invocations are made through this reference. In the process of performing a dynamic update, the translation table entries for an object are updated to point to the new instance, which causes future calls from clients to transparently invoke the new code. The object translation table can be used to support clustered object multi-processor scalability (such as multiple user stations running a single instance of an operating system), and also for hot-swapping for one or more object instances in a single-processor environment. This is true whether the object instances are newly added by the current patch or updated versions of a pre-existing object instance. For multi-processor systems where multiple user stations run from a common operating system, there is a global translation table and at each user station a localized translation table. The easier implementation for those environments is seen to be at the local translation tables, since each different local translation table will have the same virtual address on each of the different processors but may be backed by different physical addresses.

When an object that has multiple instances is updated, creations of that type of object are also redirected. This redirection is provided by the factory mechanism, described in detail below. When only one instance of an object is present, the factory mechanism may be used (where the factory has only one object) but can be avoided by replacing the object singularly as a module.

Preferably, the present invention uses a versioning scheme for dynamic updates. In a simple implementation, each factory object carries a version number, and before an update proceeds these version numbers are checked. Where mandatory prior versions are not present, at least those objects not bearing all of the mandatory prior versions are not updated. Preferably when at least one object of a factory does not reflect all mandatory prior versions, no objects of that factory are updated. The latter preference is to avoid having multiple but incomplete patches input to an operating system, which over time would be difficult to resolve given that installing the later patches to version-acceptable objects may act to prevent installing the missing patches to the version-not acceptable objects at a later time, rendering increasing numbers of object instances unusable and un-patchable through normal means.

Because hot-swapping forms an important subsection of dynamic updating according to the present invention, various implementations are outlined immediately below.

As noted above, the inventors characterize the object translation table as adding an extra level of indirection on all object invocations. This indirection enables a mechanism to be imposed above the object itself, whereby an object's entry in the object translation table (the pointer to the object) is modified. Because all accesses of an object are through the object translation table, this mechanism causes all accesses of that object to transparently invoke a different interposer object. The interposer can then choose to pass the call along to the original object. This "interposer" mechanism may be used by the hot swapping and dynamic update implementations, and is detailed as a mediator in the Appavoo publication.

Hot-swapping operates by interposing a mediator object in front of the object to be hot-swapped. The mediator passes through several phases, first tracking incoming calls until it knows (such as through the generation-count mechanism described above) that all calls are being tracked, and then suspending further calls until the existing tracked calls are complete. At this point the object is quiescent. This idle state is assured for the duration of the hot-swapping by blocking further invocations to the object instance, and blocking may be done as active threads are running and their completion is awaited, or after all active threads are completed. The former is preferable, as the mediator may enable re-access of a particular object by an existing thread while still blocking other new threads. This avoids the error of blocking all threads to the object while an existing thread requires re-access of the object to close. The mediator then performs state transfer format negotiation as above, followed by the state transfer between the old and the new object instances. Finally, it updates the object translation table reference to the new object, and forwards the blocked calls to the new object instance according to the updated object translation table.

The present invention uses in certain embodiments a module loader to avoid the need for rebooting. The module loader described above has some similarities to that used in Linux, but is seen as a simpler implementation. Specifically, it is believed that Linux must maintain a dynamic symbol table and support interdependencies between modules. The module loader implemented for this invention avoids this because all objects are invoked indirectly through the object translation tables. A module can (and to be useful should) contain code that is called by the existing kernel without requiring its symbols to be visible. Its initialization code simply instantiates replacement objects and performs hot-swap operations to invoke the code in those object instances. The present module loader performs the relocations and symbol table management preferably at the user-level (e.g., at the local translation table for a multi-CPU environment).

The factory mechanism touched on above is now described. Hot-swapping allows updating of the code and data of a single specific object instance. However, the above description is predicated on the concept that each instance of a resource is managed by a different instance of an object. To dynamically update an operating system object, the infrastructure must be able to both locate and hot-swap all instances of that object, and cause any new instantiations to use the updated object code. As noted above, this is a recognized problem; to support dynamic updates affecting data structures requires a mechanism to track all instances of those data structures and update them.

The above embodiments of the invention track object instances in a class-specific manner, and objects are typically created through calls to statically-bound methods. For example, to create an instance of the ProcessReplicated object (the implementation used by default for Process objects), the call used might be:
 ProcessReplicated::Create(
  ProcessRef &out, HATRef h, PMRef pm,
  ProcessRef creator, const char *name);
This leads to problems for dynamic update, because the Create call is bound at compile-time, and so cannot easily be redirected to an updated implementation of the ProcessReplicated object. Relying on the caller to track a newly created object instance will be ineffective unless the Create call can be redirected, and one of the inventors' goals is to enable the installation of new objects (as well as updating old objects) without rebooting the system.

To track object instances and to control object instantiations, the inventors have found that using the factory design pattern is particularly advantageous. As characterized in the prior art, the factory method is an abstraction for creating object instances. In the present invention, factories also track instances that they have created, and are themselves objects. Each factory object provides an interface for creating and updating/destroying objects of one particular class, and maintains the set of objects that it has created. A factory may be considered as a frame within which one or more objects of a single class lie. In that respect, a factory may be considered as the entries in an object translation table that point to a particular class of object instances. Preferably, all objects within a single class lie in one factory, and that factory includes no other objects from other classes. All invocations of the object go through the factory, but the objects themselves exist independently of the factory in which they lie. Deleting the factory does not necessarily mean deleting the objects within it, though pointers that previously went through the deleted factory may have to be reset to a new factory in order to invoke those objects directly.

The majority of the factory implementation is factored out using inheritance and preprocessor macros, so that adding factory support to a class is relatively simple. Using the above example to create an instance of the ProcessReplicated object, after adding the factory, the creation call may be changed to:
 DREF_FACTORY_DEFAULT(ProcessReplicated)->create( . . . );

where ( . . . ) represents the arguments as before.

The macro above hides some implementation details, whereby the default factory for a class is referenced using a static member. It expands to the following:
 (*ProcessReplicated::Factory::factoryRef)->create( . . . );

Using a factory reference allows hot-swapping of the factory itself, which is used in dynamic updating according to the present invention.

To provide basic support for configuration management, factories carry a version number identifying the specific implementation of the factory and its type. Typically, the factories in the base or original operating system all carry version zero, and updated factories have unique non-zero version numbers. Assuming a strictly linear model of update is employed, when an update occurs the current version number of the factory is compared to the version number of the update, and if the update is not the immediately succeeding version number, the update is aborted. To support reverting updates in this scheme, the previous factory version with an increased version number are preferably applied.

The inventors' implementation of the factory patterns enables increased performance and adds a high dimension of scalability. For example, in a multi-CPU environment where either processing is shared among multiple CPUs or multiple clients access a central unit where the operating system resides, object instances are tracked for dynamic update in a distributed fashion using per-CPU instance lists. Moreover, adding factories offers other advantages apart from dynamic update. For example, in order to choose between ProcessReplicated and ProcessShared, the present invention may use a configuration flag that is consulted by the code that creates process objects to determine which implementation to use. Using the factory model, this flag is removed so that the scheme supports an arbitrary number of implementations, by changing the default process factory reference to the appropriate factory object.

To perform a dynamic update of a class of object instances, the software code for the update is compiled along with some initialization code into a loadable module. When the module is loaded, its initialization code is executed. The steps that this initialization code executes to dynamically update an operating system are shown graphically at FIGS. 1A-1F.

FIG. 1A shows the operating system prior to loading any updates. A factory reference 12 has a pointer that points to an old factory object 14, which may be original in the operating system or a previous version of an update. The old factory object 14 has two old object instances, labeled a and b. All objects invoked by the old factory object 14 are of the same class. Though only two object instances a and b are shown, the reader will understand that there may be more than two but there is nearly always at least one object instance associated with any factory object under normal operations system condition (e.g., not mid-stream of an update), apart from the factory object itself (which is also an object as noted above). In the unusual circumstance where no object is associated with a factory, the step illustrated in FIG. 1E is unnecessary. All invocations of objects a and b are through its factory object 14 via the factory reference 12.

Figure 1B:
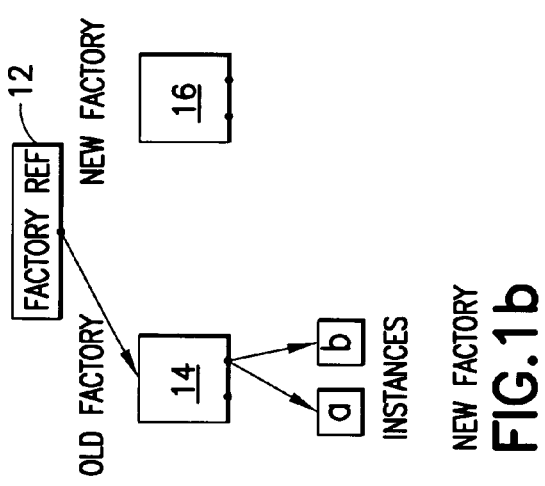

At FIG. 1B, a new factory object 16 for the updated class of objects is loaded and its execution is automatically instantiated once fully loaded. As above, a precondition to further execution of updates is checking the version number of the new factory object 16 against the version number of the existing old factory object 14. If the version number of the old factory object 14 is incorrect, the update is aborted. This is not to say that the version number of the old factory object 14 must immediately precede that of the new factory object 16, only that the version number of the old factory object 14 must be compatible with the updates of the new factory object 16.

Figure 1C:
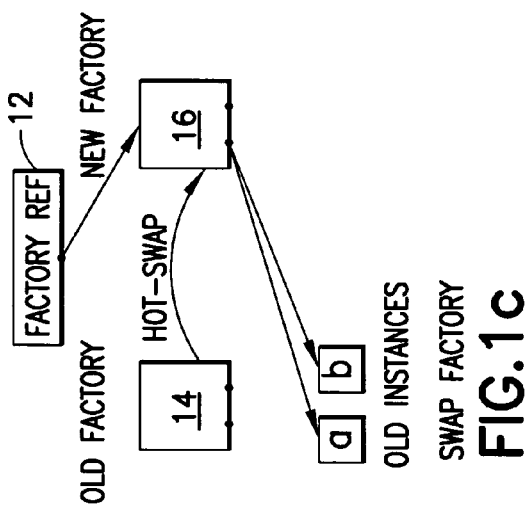

As shown in FIG. 1C, the old factory object 14 is located using its statically bound factory reference 12, and hot-swapped to the new factory object 16. This hot-swapping changes the pointer (from the factory reference 12) from the old factory object 14 to the new factory object 16, and sets pointers from the new factory object 16 to all of the old object instances a and b. The new factory object 16 thereby receives the set of object instances a and b that was being maintained by the old factory object 14, and the old factory object 14 is merely a shell through which the old object instances a and b can no longer be invoked. For this reason, either prior to the version check or prior to hot-swapping the factories 14, 16 (preferably after the version check), a quiescent state is determined for each of the old object instances a and b that are hot-swapped from the old factory object 14 to the new factory object 16. Further execution of the dynamic update code may be delayed until all old factory objects a and b are quiescent (reach a safe point), or they may be updated as detailed in FIGS. 1C-1F individually as they each become quiescent. Further invocations of each old object instance a and b are blocked so that they remain in a quiescent state throughout updating, again either en masse or individually.

Figure 1D:
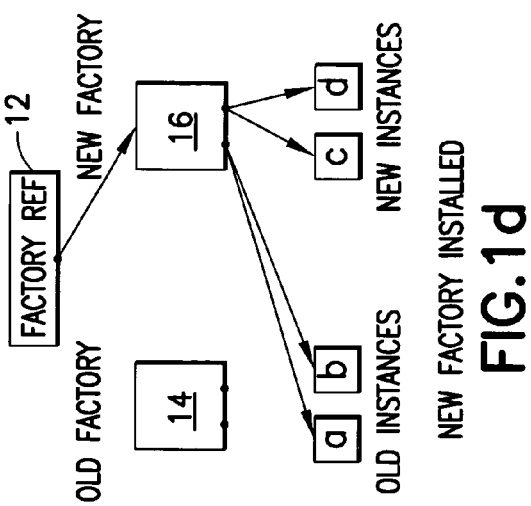
Figure 1E:
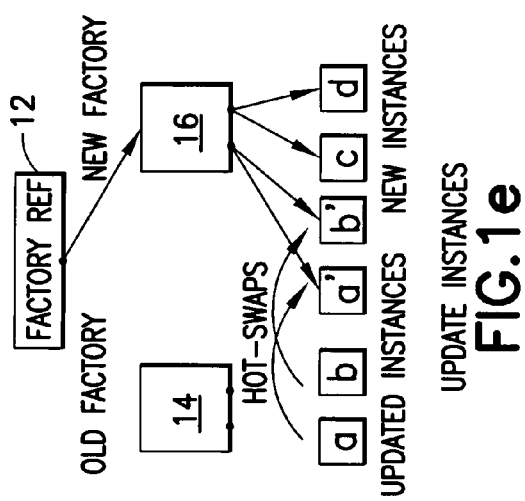

Once the factory hot-swap of FIG. 1C is completed for all object instances a and b within the object class defined by the factory 14, 16, all new instantiations of those old objects a and b are handled by the new factory object 16 as shown in FIG. 1D, and therefore go to the updated class. Note that at this juncture, the old object instances have not yet been updated. FIG. 1D also shows that new object instances c and d, which are within the same new factory object 16 and which may be of a class that is newly introduced, are also now available through the new factory object 16 and the factory reference 12. These new object instances c and d are those newly created with the current dynamic update (the new factory object 16), and may be made immediately available for invocation by the broader operating system once the factory hot swap of FIG. 1C is complete, regardless of whether the old object instances a and b are yet updated.

To update the old instances, the new factory object 16 traverses the set of old object instances a and b that it received from the old factory object 14. For each old object instance a and b, the dynamic update code creates an updated object instance a' and b', and then initiates a hot-swap between the old object instance a and b and the updated object instances a 'and b', as shown in FIG. 1E. At this juncture, the new factory 16 is 'tracking' the updated object instances a' and b' in that pointers to them are added to the new factory 16. This step proceeds in parallel across all CPUs where the old factory object 14 was in use (for multi-CPU embodiments), and while the rest of the system is functioning. Because each object instance is hot-swapped individually, and because the present invention encapsulates all data behind object instances, there is no requirement to block all accesses to all objects of the affected type while an update is in progress. At any given time, access needs to be blocked only from the particular object of the class that is currently being hot-swapped. While blocking may occur over all objects of that class, blocking and hot-swapping by individual object instances is preferable as it allows greater functionality of the operating system while dynamic update proceeds, since at any given instant it is possible to have only one object instance (or possibly two, assuming some chronological overlap between releasing a block on one object instance and initiating blocking of another) is removed from access by the operating system, rather than the entire class of object instances. For a multi-processor system, all old instances of an object may be updated in parallel, or separately if it is seen as advantageous to have one or more users retain access to a particular old object instance while it is being updated for another user.

Figure 1F:
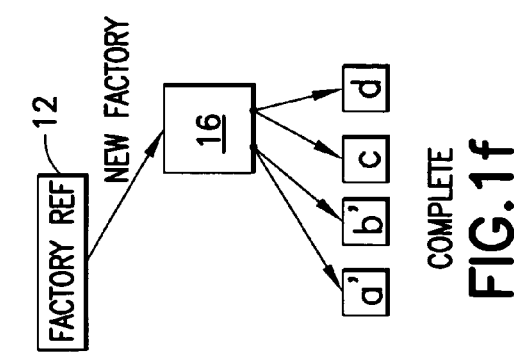

At FIG. 1F, dynamic update of the class of object instances is completed by destroying the old factory object 14.

Implementation of dynamic updating is simpler in certain cases, for example when an update adds new objects to the system that do not replace any existing objects, or when an update affects an object with only a single instance. FIGS. 1A-1F illustrate a more comprehensive dynamic update that addresses the different scenarios of updating old object instances and adding new object instances.

Following are some examples of dynamic updating that the inventors have implemented on an experimental scale. A first example is adding a new kernel interface for a partitioned memory region. Benchmarking of a memory-intensive parallel application showed poor scalability during the initialization phase of the above factory object approach. The inventors then determined that a bottleneck occurred during an object instance update that resized a shared hash table structure. A new partitioned memory management object was developed that did not suffer from the problem, and was added in a dynamic update as a new object instance. This new object added a new interface to the kernel, allowing user programs to create a partitioned memory region if they specified extra parameters, resolving the bottleneck.

Adding a new piece of code to the kernel and making it available through a new interface is the simplest case of dynamic update, because it avoids replacing old code or transferring state information. This update was implemented as a simple loadable module, consisting of the code for the new region object and some initialization code to load it and make it available to user programs. This module could be shipped with programs requiring it, or could be loaded into the kernel on demand when a program requires the new interface, either way avoiding a reboot.

This first example demonstrates the use of the module loader combined with an extensible kernel interface to add new functionality to a running kernel. The loader module is detailed above to effect dynamic updates without requiring a reboot. Prior art update systems also allow modules to be loaded, for example to provide new file systems or device drivers. However, the modularity of the present invention makes it possible to replace a portion of the page-fault path for a critical application with a new set of requirements, which could not be done on an existing system such as Linux.

A second example is a patch for a memory allocator race condition. This scenario involves a bug fix to a kernel service, one of the key motivations for dynamic update. In the course of development, the inventors discovered a race condition in the core kernel memory allocator that could result in a system crash when kernel memory was allocated concurrently on multiple CPUs.

Fixing this bug required adding a lock to guard the allocation of memory descriptors, a relatively simple code change. In fact, only two lines of code were added, one to declare the lock data structure, and another to acquire (and automatically release on function return) the lock. A recompile and reboot would have brought the fix into use. However, even with continual memory allocation and deallocation occurring, the update was applied dynamically using the added object technique above, without having to reboot.

The replacement code was developed as a new class inheriting almost all of its implementation from the old "buggy" object, except for the declaration of the lock and a change to the function that acquired and released it. This caused the C++ compiler to include references to all the unchanged parts of the old class in the replacement object code, significantly avoiding programmer errors. Simple copying implementations of the state transfer functions were also provided to allow the object to be hot-swapped. The key parts of the new class implementation are shown in FIG. 2.

The new class was compiled into a loadable module, and combined with initialization code that instantiated the new object and initiated a bot-swap operation to replace the old "buggy" object instance. Because this object was a special case object with only a single instance, it was not necessary to use the factory mechanism, though of course the factory mechanism could be used with only one new object to add and none to update. This second example demonstrates the use of hot-swapping as part of the present dynamic update mechanism, combined with a kernel module loader, to dynamically update live code in the system.

A third example is optimization of a file cache manager and its implementation of file cache manager objects. The inventors instantiated a file cache manager in the kernel for each open file or memory object in the system. They discovered that the unmapPage method did not check if the page in question was already unmapped before performing expensive synchronization and IPC operations. These were unnecessary in some cases.

In this third example, the inventors developed a new version of the file cache manager object that performed the check before unmapping, and prepared it as a loadable module. Applying this update dynamically required the factory mechanism, because the running system had file cache manager instances present that needed to be updated, and because new instantiations of the file cache manager needed to use the code in the updated module.

This scenario demonstrates all major components of the present dynamic update implementation, using a module loader to load the code into the system, a factory to track all instances of state information that are affected by an update, and hot-swapping to update each instance.

Figure 3:
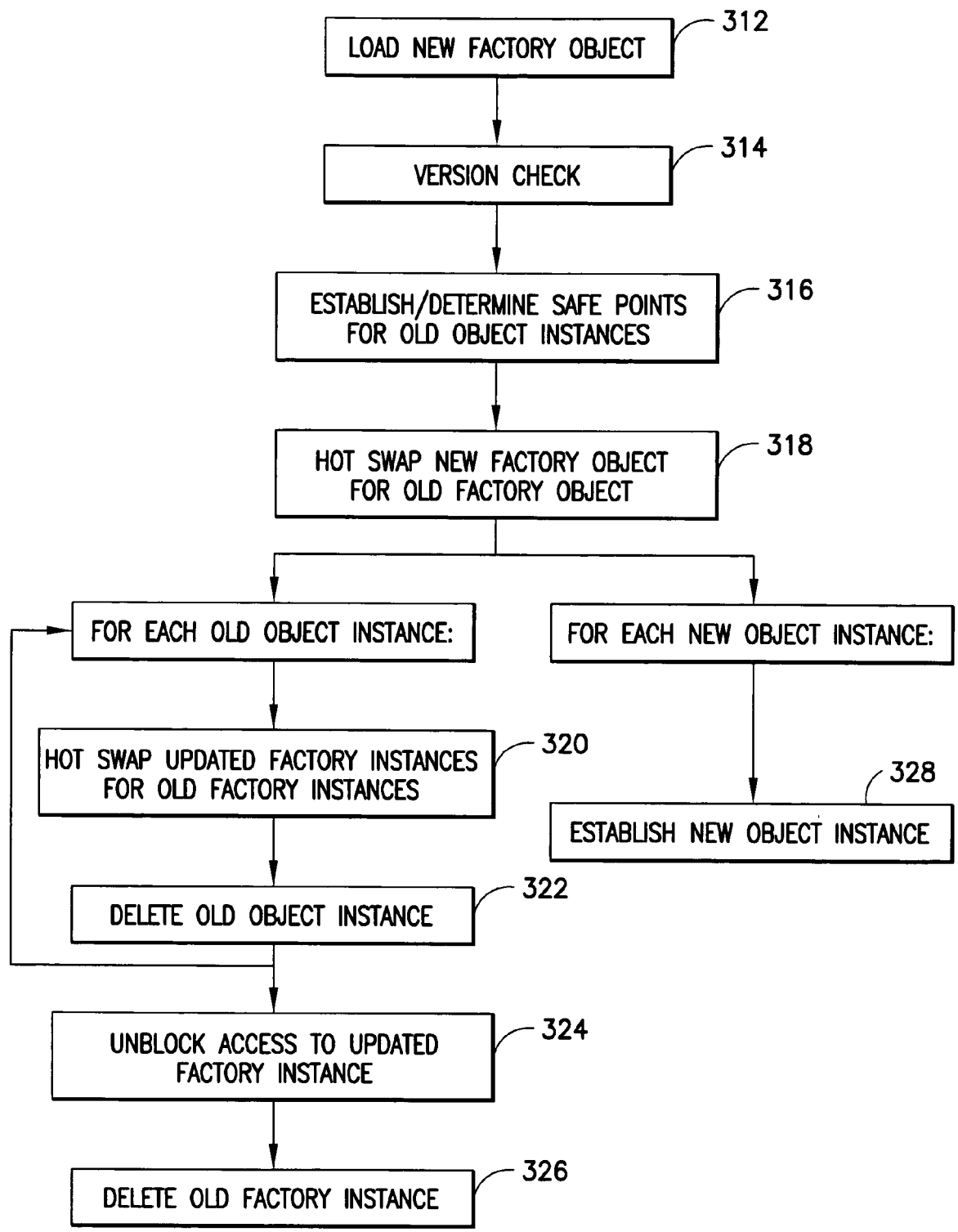
FIG. 3 is a block diagram of method steps in dynamically upgrading using the factory method according to embodiments of the invention.

FIG. 3 illustrates steps in the factory method detailed above. First, a new factory object is loaded 312 that has an updated object instance and a new object instance, each object instance within the same object class. Next, a version check is performed 314 that ensures the corresponding old factory object is compatible with the new factory object. Preferably, only the old factory object version need be checked but in some less efficient implementations it may be that the version of each of the old object instances of the old factory object need to be checked. If compatibility is not assured, the dynamic update is aborted.

Next, a safe point is sought and established 316 for each of the old objects, such as by blocking access to each, and determining when all threads accessing each of the old objects are terminated. Once quiescence is established for all of the affected old object instances (e.g., all those with a companion updated object instance in the new factory), the pointer between the factory reference and the old factory object is changed to go between the factory reference and the new factory object, hot-swapping those factory objects 318. Each old object instance of the old factory is then hot-swapped with its corresponding updated object instance 320 in the new factory. As each completes, the old object instance is deleted 322, with the proviso that where format of underlying data structures is not changed, the underlying data structures may be retained without copying and merely pointers to that structure are reset to run from the updated object instance rather than from the old object instance. Once all old object instances are deleted, the blocking can be released 324 and the old factory object may be deleted 326.

Any new object instances are merely added by establishing 328 a pointer from the new factory object to the new object instance; no blocking, safe point, or swapping need be done on these because there are no existing invocations of the new object instance that may precede its being made available through the new factory object, and no corresponding old objects with which to swap.

An exemplary embodiment in accordance with this invention is a method of dynamically updating an operating system. The method comprises: loading a new factory object having at least one of a new object instance and an updated object instance; determining that a version identifier of a corresponding old factory object is compatible with the new factory object; setting a pointer that goes between a factory reference and the old factory object to go between the factory reference and the new factory object. The method includes, for the case of each updated object instance, establishing a safe point for the old object instance that corresponds to the updated object instance: changing a factory reference pointer within the operating system from the old factory object to the new factory object; hot swapping the updated object instance for the old object instance; and deleting the old object instance. The method also includes, for the case of each new object instance, establishing a pointer from the new factory object to the new object instance; and deleting the old factory object. The method may also include updating a kernel of the operating system by relating indeterminate references to either or both of kernel symbols or library routines, the indeterminate references present in a kernel update module, to at least one object translation table without rebooting the operating system.

The above description is not seen to be exhaustive of all embodiments or variations of the present invention, many of which will be obvious to those skilled in the art and within the ensuing claims.

What is claimed is:

1. A signal bearing medium tangibly embodying a program of machine-readable instructions executable by a digital processing apparatus to perform operations to dynamically update an operating system, the operations comprising:

loading a new factory object, where a factory object is configured to create object instances and to maintain object instances generated by the factory;

executing a dynamic update procedure that comprises:

changing a factory reference pointer within the operating system from the old factory object to the new factory object; and for each old object instance maintained by the old factory object: using the new factory object to create a new object instance; transferring state information from the old object instance to the new object instance; and deleting the old object instance; and in response to completion of the dynamic update procedure, removing the old factory object.

2. The signal bearing medium of claim 1 wherein the new factory object comprises a new object, the operations further comprising enabling invocations of the new object through the new factory object.

3. The signal bearing medium of claim 1, wherein, for the case where a data format of an old object instance is not identical to that of its corresponding new object instance, transferring state information comprises copying a data structure of the old object instance via a common intermediate format to the new object instance.

4. The signal bearing medium of claim 1, wherein, for the case where a data format of an old object instance is identical to that of its corresponding new object instance, transferring state information comprises resetting a pointer between the old object instance and an underlying data structure used by the old object instance to point from the corresponding new object instance to the underlying data structure, and wherein removing the old object instance does not comprise deleting the underlying data structure.

5. The signal bearing medium of claim 4, wherein transferring state information does not comprise making a copy of the underlying data structure.

6. The signal bearing medium of claim 1, further comprising determining when at least one of the old object instances reaches a safe point prior to changing the factory reference pointer.

7. The signal bearing medium of claim 6, wherein determining when the old object instance reaches a safe point further comprises blocking new invocations of the old object instance.

8. The signal bearing medium of claim 1, wherein the operating system is dynamically updated without rebooting.

9. The signal bearing medium of claim 1, further comprising an embodied kernel module loader program that downloads the machine readable instructions into a kernel of the operating system and initiates the steps of the dynamic update procedure.

10. The signal bearing medium of claim 1, where the operations further comprise determining that a version of a corresponding old factory object is compatible with the new factory object.

11. The signal bearing medium of claim 1, where the dynamic update procedure further comprises:

tracking incoming calls to the old factory object;

in response to all pending calls to the old factory object being tracked, suspending subsequent calls to the old factory object; and, in response to determining that all pending calls to the old factory object are complete, determining that the old factory object is quiescent, where setting the pointer is performed when the old factory object is quiescent; and forwarding the suspended subsequent calls to the new factory object.

12. The signal bearing medium of claim 1, where the dynamic update procedure further comprises:

tracking incoming calls to the old object instance;

in response to all pending calls to the old object instance being tracked, suspending subsequent calls to the old object instance;

in response to determining that all pending calls to the old object instance are complete, determining that the old factory object is quiescent; and in response to transferring state information, forwarding the suspended subsequent calls to the new object instance.

13. A method of dynamically updating an operating system comprising:

loading a new factory object, where a factory object is configured to create object instances and to maintain object instances generated by the factory;

executing a dynamic update procedure that comprises:

setting a pointer that goes between a factory reference and the old factory object to go between the factory reference and the new factory object; and for each old object instance maintained by the old factory object: using the new factory object to create a new object instance; establishing a safe point for the old object instance transferring state information from the old object instance to the new object instance; and deleting the old object instance; and in response to completion of the dynamic update procedure, deleting the old factory object.

14. The method of claim 13, further comprising updating a kernel of the operating system by relating indeterminate references to either or both of kernel symbols or library routines, the indeterminate references present in a kernel update module, to at least one object translation table without rebooting the operating system.

15. The method of claim 13, wherein the new factory object comprises at least one additional object instance and at least one new object instance, where said additional object instance is of a different class than each of the new object instances.

16. The method of claim 13, wherein, for the case where the old object instance exhibits an identical data format as its corresponding new object instance, transferring state information comprises resetting a pointer between the old object instance and an underlying data structure used by the old object instance to go between the new object instance and the underlying data structure, and deleting the old object instance comprises deleting only that portion of the old object instance that is not the underlying data structure.

17. The method of claim 13, wherein establishing, transferring, and deleting are executed for each of the updated object instances separately.

18. The method of claim 13, wherein establishing, changing, transferring, and deleting are executed for each of the new object instances in parallel in a multi-user operating system environment.

19. The method of claim 13, wherein establishing a safe point comprises blocking new access to the old object instance and determining when all existing access threads to the old object instance are terminated.

20. The method of claim 13, wherein establishing a safe point and transferring are done separately for at least two old object instances for the case where the computer comprises a multi-user environment.

* * * * *